(12) United States Patent
Klein et al.

(10) Patent No.: US 10,369,831 B2
(45) Date of Patent: Aug. 6, 2019

(54) PRINTED IMAGE

(71) Applicant: MERCK PATENT GMBH, Darmstadt (DE)

(72) Inventors: Sylke Klein, Rossdorf (DE); Heidemarie Montag, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 221 days.

(21) Appl. No.: 14/913,596

(22) PCT Filed: Jul. 25, 2014

(86) PCT No.: PCT/EP2014/002036
§ 371 (c)(1),
(2) Date: Feb. 22, 2016

(87) PCT Pub. No.: WO2015/024619
PCT Pub. Date: Feb. 26, 2015

(65) Prior Publication Data
US 2016/0207344 A1    Jul. 21, 2016

(30) Foreign Application Priority Data
Aug. 23, 2013 (EP) .................................. 13004179

(51) Int. Cl.
*B42D 25/00* (2014.01)
*B42D 25/378* (2014.01)
(Continued)

(52) U.S. Cl.
CPC .............. *B42D 25/29* (2014.10); *B41F 11/02* (2013.01); *B41M 1/14* (2013.01); *B41M 3/14* (2013.01); *B42D 25/00* (2014.10); *B42D 25/364* (2014.10); *B42D 25/373* (2014.10); *B42D 25/378* (2014.10); *B42D 25/435* (2014.10); *C09D 11/037* (2013.01); *C09D 11/50* (2013.01); *B41M 1/20* (2013.01); *B41M 3/144* (2013.01); *B41M 5/24* (2013.01); *B41M 5/26* (2013.01)

(58) Field of Classification Search
None
See application file for complete search history.

(56) References Cited

U.S. PATENT DOCUMENTS 4,544,415 A   10/1985   Franz et al.
5,873,934 A    2/1999   Kunii et al.
(Continued)

FOREIGN PATENT DOCUMENTS

CN   1330506 C    8/2007
CN   102169653 A  8/2011
(Continued)

OTHER PUBLICATIONS

JP 2001106937 Translation.*
(Continued)

*Primary Examiner* — Kyle R Grabowski
(74) *Attorney, Agent, or Firm* — Millen, White, Zelano and Branigan, P.C.

(57) ABSTRACT

The present invention relates to a printed image comprising flake-form effect pigments which has striking matt/gloss effects, to a process for the production of a printed image of this type, and to the use thereof, in particular in security printing.

20 Claims, 3 Drawing Sheets

(51) Int. Cl.
*B42D 25/435* (2014.01)
*B42D 25/29* (2014.01)
*B41M 1/14* (2006.01)
*B41M 3/14* (2006.01)
*B42D 25/364* (2014.01)
*B42D 25/373* (2014.01)
*C09D 11/037* (2014.01)
*C09D 11/50* (2014.01)
*B41F 11/02* (2006.01)
*B41M 1/20* (2006.01)
*B41M 5/24* (2006.01)
*B41M 5/26* (2006.01)

(56) References Cited

U.S. PATENT DOCUMENTS

| | | | |
|---|---|---|---|
| 6,488,757 B2 | 12/2002 | Glausch | |
| 7,160,374 B2 | 1/2007 | Umehara et al. | |
| 7,354,072 B2 * | 4/2008 | Yokote | B42D 25/29 283/92 |
| 7,713,616 B2 * | 5/2010 | Kuntz | B42D 15/0006 283/72 |
| 8,055,064 B2 | 11/2011 | Kiuchi et al. | |
| 2002/0096087 A1 | 7/2002 | Glausch | |
| 2004/0125169 A1 * | 7/2004 | Nakagawa | B05D 5/083 347/45 |
| 2004/0195823 A1 | 10/2004 | Yokote et al. | |
| 2009/0128858 A1 | 5/2009 | Kiuchi et al. | |
| 2010/0072739 A1 * | 3/2010 | Kuntz | B42D 25/00 283/70 |
| 2011/0239885 A1 | 10/2011 | Marchant et al. | |
| 2012/0137910 A9 | 6/2012 | Marchant et al. | |
| 2013/0239828 A1 | 9/2013 | Chen et al. | |
| 2013/0270812 A1 | 10/2013 | Murakami et al. | |

FOREIGN PATENT DOCUMENTS

| | | | |
|---|---|---|---|
| CN | 102186677 A | 9/2011 | |
| CN | 103249891 A | 8/2013 | |
| DE | 102011016511 A1 | 10/2012 | |
| EP | 1203794 B1 | 10/2001 | |
| EP | 1203795 A1 | 10/2001 | |
| EP | 1422070 A1 | 5/2004 | |
| EP | 1864825 A1 | 12/2007 | |
| EP | 2174796 A1 | 4/2010 | |
| JP | 2001106937 A * | 4/2001 | C09C 1/0015 |
| WO | 9632446 | 10/1996 | |

OTHER PUBLICATIONS

Office Action for related Chinese Patent Application No. 201480046322 dated Jul. 24, 2017.
International Search Report dated Feb. 3, 2015 issued in corresponding PCT/EP2014/002036 application (pp. 1-2).
English Abstract for EP1203794, Publication Date: Oct. 25, 2001.
English Abstract for DE102011016511, Publication Date: Oct. 11, 2012.

* cited by examiner

Dark coloration of the substrate

PRINTED IMAGE

The present invention relates to a printed image on a substrate, in particular to a printed image which comprises flake-form effect pigments and exhibits striking matt/gloss effects, to a process for the production of a printed image of this type, and to the use of a printed image of this type, in particular for decorative or security purposes.

Decorative articles, such as, for example, packaging of high-quality goods, stationery products or in particular also various security printing products, have for years been provided with high-quality imprints in order to produce striking optical effects which are intended to attract attention. The printing inks required for this purpose often comprise pearlescent pigments or metal-effect pigments, which, owing to their shimmering optical appearance, which may also change with the viewing angle, appear particularly suitable for the said applications.

In particular in the case of security printing products, the optical effects which can be achieved by the said effect pigments are increasingly also additionally combined with functional properties, such as, for example, electrical conductivity or magnetic alignability, in order to prevent the products from being copyable and thus to increase their security against counterfeiting.

Owing to the high productivity and the processes established on the market, printing processes are particularly suitable for the production of high-quality mass products which are inexpensive to produce.

It is therefore becoming increasingly important in the development of decoration elements or functional and/or decorative security features that such elements can be produced in a simple manner in printing processes.

Particular attention applies to highly glossy surfaces, which can be applied to a multiplicity of substrates in conventional printing processes. Employed as security feature, the highly glossy surface should at least also have another, non-optical function. Highly glossy surface sections are preferably employed in combination with non-glossy or only weakly glossy surface sections in another or the same colour, for example in the form of graphical patterns.

The strength of the gloss of surfaces can be described by means of the degree of reflection of the corresponding surface. The degree of reflection of a surface exposed to electromagnetic radiation is essentially determined by the phenomena reflection, scattering and refraction. Ideally, the highest degree of reflection is achieved in the case of virtually complete reflection of the incident directed light—without significant proportions of undirected scattering or refraction—for example to be observed in the case of the mirror effect of highly polished metal surfaces or of metal layers which are deposited from the gas phase on ideally planar substrates, such as, for example, glass sheets.

The degree of reflection of electromagnetic radiation at a surface is defined as the ratio of directionally reflected light intensity to incident directed light intensity. In phenomenological terms, the directed reflection of a surface is perceived as a gloss effect, the undirected diffuse reflection as a matt effect. In physical terms, gloss is defined as the quotient of the directionally reflected proportion and the diffusely reflected proportion of the light falling on a surface.

At planar non-metallic surfaces, the incident directed light is not only reflected, but also refracted. The magnitude of the degree of reflection depends on the angle of incidence and on the difference in the refractive indices, i.e. the degree of reflection increases with increasing refractive index of the non-metallic surface at a constant angle of incidence.

In order to achieve a high degree of reflection in surface layers comprising effect pigments, the effect pigments themselves must have a highly planar pigment surface and a pronounced flake form and be aligned parallel to the substrate surface in the layer. The more pigments present in the reflection position, the higher the achieved degree of reflection and the glossy appearance with a metallic look.

The best reflection values are achieved with metal pigments which, for better gloss production, are usually provided at the surface of the application medium with a surface modification which produces the so-called leafing effect in the pigments. This final pigment coating leads to the resultant pigments no longer being completely wetted by the binder used and attempting to float in the applied wet film and to align with the layer surface. In the case of metal pigments, stearic acid, which results in a hydrophilic/oleophobic surface nature of these effect pigments, is frequently employed in order to achieve the leafing effect. Metal pigments coated in this way are generally employed in automobile paints.

An opposite effect can be achieved with a surface treatment in which branched or unsaturated fatty acids, such as, for example, oleic acid, are used instead of stearic acid, producing a non-leafing effect. This treatment causes the pigment surface to become oleophilic. These non-leafing pigments can be wetted well by means of conventional paint binders and incorporated into paints or inks.

Metal pigments are available on the market either only as leafing grades (gold bronze, zinc pigments) or as leafing and non-leafing grades (aluminium pigments).

The reflection effect produced by means of layers comprising metal pigments is dependent on the viewing angle. An informative quantity for this effect, known as "metallic travel" or lightness flop, is the so-called flop index. Whereas simple gloss measuring instruments determine the gloss at a fixed angle (20°, 60° or 85°), the flop index is characterised by the lightness values (L* values in the CIELAB system) at 15°, 45° and 110°. Starting from the specular angle, the change in the reflection is considered over this large range of the viewing angle. The flop index is defined as:

$$\text{Flop index} = \frac{2.69(L^*_{15°} - L^*_{110°})^{1.11}}{(L^*_{45°})^{0.86}}$$

In the case of single-coloured layers comprising absorption pigments the flop index is equal to zero, in the case of layers having a very high degree of reflection comprising metal pigments the flop index is between 15 and 17.

Effect pigments having a non-metallic surface, such as metal pigments coated with metal compounds, in particular metal oxides, or non-metallic substrates coated with one or more layers of metal oxides or oxide hydrates, such as natural and synthetic mica, borosilicate, silicon dioxide, aluminium oxide and titanium oxide flakes, also exhibit an angle-dependent reflection behaviour. These pigments are commercially available, for example under the trade names Meoxal®, Iriodin®, Phoenix®, Pyrisma®, Miraval®, Firemist®, Colorstream®, Colorcrypt® and Xirallic®.

Such effect pigments, exhibiting a non-metallic surface, are usually post-coated for example with organosilicon compounds, such as silanes containing fluorine groups (EP 1203794; EP 1203795; U.S. Pat. No. 7,160,374) or polysiloxanes (U.S. Pat. No. 4,544,415; WO 96/32446), as outer sheath in order to increase their weather stability and nevertheless to achieve sufficiently good orientation/coupling of the effect pigments to a colour layer or a plastic component to be pigmented.

If these effect pigments are coated with functionalised silanes/siloxanes, they surprisingly likewise exhibit a leafing effect in the powder coating application, which is evident from higher lightness, but also from increased directed scattering at the coated surface. Due to the increased scattering, the powder coating layers pigmented in this way have reduced gloss, compared with powder coating layers comprising uncoated effect pigments.

Regarding use in printing inks, no extensive investigations have been carried out to date with respect to surface treatment of effect pigments having non-metallic surfaces which could result in a leafing effect, since effect pigments which are intended for use in printing inks usually only receive surface modifications which simplify stable, homogeneous and settling-free incorporation of the effect pigments into the printing ink, if any at all.

The object of the present invention is, on use of effect pigments having a non-metallic surface layer in a printing process, to provide printed images which have, at least in part-areas, very high gloss which can be combined with corresponding matt effects, ideally without the material composition of the pigments employed for the gloss and matt effects being significantly different from one another, if possible at the same time with the presence of at least one non-optical function of the printed image.

A further object of the present invention consists in providing a process for the production of the printed images described above.

In addition, an additional object of the present invention consists in proposing the use of the printed images produced in this way.

The object of the present invention is achieved by a printed image which consists of at least two area units on a substrate, where each of the area units comprises flake-form effect pigments and a binder, where a first area unit comprises a first flake-form effect pigment which is based on coated support flakes and has an outer layer comprising a non-metallic, inorganic material, and a second area unit comprises a second flake-form effect pigment which is based on coated support flakes and has an outer layer comprising an organic surface modifier.

In addition, the object of the present invention is achieved by a process for the production of a printed image described above, in which a first printing ink, comprising a first flake-form effect pigment, which is based on a coated support flake and has an outer layer comprising a non-metallic, inorganic material, and a binder, is applied to a substrate with formation of a first area unit of a printed image and solidified, and a second printing ink, comprising a second flake-form effect pigment, which is based on a coated support flake and has an outer layer comprising an organic surface modifier, and a binder, is applied to a substrate with formation of a second area unit of a printed image and solidified.

In addition, the object of the present invention is also achieved by the use of a printed image described above as decoration element, as functional element or as security feature on a product.

A printed image in the sense of the present invention is a solid, two-dimensional coating on a substrate which has been applied to the substrate by means of a conventional printing process.

The printed image in accordance with the present invention has at least two area units, which each comprise flake-form effect pigments and a binder, and are distinguishable from one another. In accordance with the invention, the at least two area units are optically distinguishable from one another in that they at least have degrees of reflection, or flop indices, which are different from one another. This difference is evident phenomenologically through a matt/gloss effect which is visible optically to the naked eye, where one of the area units has a matt effect and the other area unit has a pronounced gloss effect.

In addition, the at least two area units may also have colour impressions which are different from one another and identical or different functionalities, such as intrinsic or direct electrical conductivity, magnetic or magnetisable properties, IR and/or UV absorption properties or luminescence properties (fluorescence, phosphorescence or electroluminescence).

The printed image according to the invention has at least two area units which comprise flake-form effect pigments and a binder, but may also have three or more area units of this type. At least two of these area units must be different from one another, i.e. have at least the difference in the respective flop indices described above. These two area units are preferably directly adjacent to one another on the substrate or arranged so close to one another that they can be registered simultaneously with the naked eye when viewed.

The first and second area unit may also, for example, repeat alternately continuously on the printed image according to the invention or be arranged alternately in a star or circle shape with one another from the inside to the outside.

The graphic design of the printed image is not subject to any restrictions so long as the printed image has at least two area units of the type described above which can be distinguished from one another.

It is of course not necessary for the entire substrate to be coated with the printed image according to the invention. For the purposes of the present invention, it is sufficient for only part-areas of the respective substrate to be provided with the printed image according to the invention.

Each of the at least two area units described above comprises flake-form effect pigments.

The first area unit here comprises flake-form effect pigments which are based on coated support flakes and have an outer layer comprising a non-metallic, inorganic material.

Suitable support flakes here are all known flake-form support materials which are usually employed for the preparation of effect pigments, i.e. metallic and non-metallic support flakes.

Preferably, however, transparent or semitransparent support flakes are employed. Suitable are, for example, phyllosilicates, in particular synthetic or natural mica, glass flakes, metal flakes, $SiO_x$ flakes ($x \leq 2.0$; preferably $x=2$), $Al_2O_3$ flakes, $TiO_2$ flakes, synthetic or natural iron oxide flakes, graphite flakes, liquid crystal polymers (LCPs), holographic pigments, BiOCl flakes or mixtures of the said flakes. The metal flakes may consist, inter alia, of aluminium, titanium, bronze, steel or silver, preferably of aluminium or titanium. The metal flakes here may be passivated by corresponding treatment.

Preference is given to flakes comprising synthetic or natural mica, glass flakes, $SiO_2$ flakes and $Al_2O_3$ flakes, in particular synthetic or natural mica flakes, glass flakes and $Al_2O_3$ flakes.

The flake-form pigment support is coated on one or both surfaces (top and bottom of the flake) with one or more, transparent, semitransparent or opaque layers comprising metal oxides, metal oxide hydrates, metal suboxides, metals, metal fluorides, metal nitrides, metal oxynitrides or mixtures of these materials. The support flake is preferably surrounded by these layers. It is essential in accordance with the invention that the outer layer on the support flake consists of a non-metallic, inorganic material which is selected from the said non-metallic materials.

The metal oxide, metal oxide hydrate, metal suboxide, metal, metal fluoride, metal nitride, metal oxynitride layers or the mixtures thereof may be of low refractive index (refractive index<1.8) or high refractive index (refractive index ≥1.8; preferably of ≥2.0.). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxides, tin oxide, cerium oxide, zinc oxide, zirconium oxide, chromium oxide, titanium oxide, in particular titanium dioxide in the rutile or anatase modification, titanium oxide hydrate and mixtures or mixed oxides of the above-mentioned materials, such as, for example, ilmenite or pseudobrookite. Metal suboxides which can be employed are, for example, the titanium suboxides. Suitable metals which can be employed for interlayers are, for example, chromium, aluminium, nickel, silver, gold, titanium, copper or alloys, a suitable metal fluoride is, for example, magnesium fluoride. Metal nitrides or metal oxynitrides which can be employed are, for example, the nitrides or oxynitrides of the metals titanium, zirconium and/or tantalum. Preferably metal oxide, metal, metal fluoride and/or metal oxide hydrate layers and very particularly preferably metal oxide and/or metal oxide hydrate layers are applied to the substrate, where metal oxide, metal fluoride and/or metal oxide hydrate layers are selected for the outer layer. Especial preference is given to oxides and/or oxide hydrates of aluminium, silicon, iron, tin and titanium or mixed oxides or mixtures of at least two of the above-mentioned.

Multilayered structures comprising high- and low-refractive-index metal oxide, metal oxide hydrate, metal or metal fluoride layers may also be present, where high- and low-refractive-index layers preferably alternate with one another. Especial preference is given to layer packages comprising a high-refractive-index layer (refractive index ≥1.8) and a low-refractive-index layer (refractive index <1.8), where one or more of these layer packages may be applied to the support flake. The sequence of the high- and low-refractive-index layers can be adapted here to the material of the support flake in order also to incorporate the latter into the multilayered structure.

The metal oxide, metal oxide hydrate, metal suboxide, metal, metal fluoride, metal nitride, metal oxynitride layers may also be mixed or doped with colorants or other elements. Suitable colorants or other elements are, for example, inorganic coloured pigments, such as coloured metal oxides, for example magnetite, chromium oxide, or coloured pigments, such as, for example, Berlin Blue, ultramarine, bismuth vanadate, Thenard's Blue, suitable doping elements are elements such as, for example, yttrium, magnesium, aluminium or antimony.

In accordance with the invention, the outer layer on the coated support flake consists of a non-metallic, inorganic material. Of the materials mentioned above, titanium dioxide, both in the rutile and also in the anatase modification, iron(III) oxide in any of the possible crystal modifications and also mixtures or mixed oxides of $TiO_2$ and $Fe_2O_3$, or also $Fe_3O_4$, are, in particular, particularly suitable for the outer layer if the outer layer is a so-called optically active layer, i.e. a layer which has a refractive index and layer thickness at which the layer can make an independent contribution to the interference and/or absorption colour of the pigments. However, if the outer layer consists of a so-called inorganic post-coating, which is usually applied in the art to effect pigments in order to improve their chemical stability and/or in order to simplify incorporation of the pigments into the application medium, preferred materials for the outer layer are $SiO_2$, $Al_2O_3$, $ZrO_2$, $Ce_2O_3$ or oxide hydrates thereof. Post-coatings of this type are applied in layer thicknesses of only a few nanometres, so that they do not make an independent contribution to the interference and/or absorption colour of the pigments.

Effect pigments comprising layers comprising the above-mentioned materials exhibit great colour variety with respect to their mass tone, usually strong interference colours and may in many cases exhibit an angle-dependent change in the interference colour (optically variable behaviour).

Pigments of the structure described above are known in the art, depending on their specific structure, as pearlescent pigments, interference pigments, metal-effect pigments or optically variable pigments.

Effect pigments preferably employed in accordance with the invention for the first area unit have the following structure (A), (B) or (C), where the expression $TiO_2/Fe_2O_3$ denotes a layer which comprises $TiO_2$ and $Fe_2O_3$ as a mixture or as a mixed oxide, for example pseudobrookite. Oxides in brackets are optional. For the rutilisation of titanium dioxide, a tin dioxide layer is preferably applied below a titanium dioxide layer.

substrate flake+($SiO_2$)+$TiO_2$ (rutile)

substrate flake+($SiO_2$)+$SiO_2$+$TiO_2$ (rutile)

substrate flake+($SiO_2$)+$TiO_2$ (rutile)+$SiO_2$+$TiO_2$ (rutile)

substrate flake+($SiO_2$)+$TiO_2$ (anatase)+$SiO_2$+$TiO_2$ (anatase)

substrate flake+($SiO_2$)+$TiO_2$/$Fe_2O_3$+$SiO_2$+$TiO_2$+$TiO_2$/$Fe_2O_3$ substrate flake+($SiO_2$)+$TiO_2$/$Fe_2O_3$+$SiO_2$+$TiO_2$/$Fe_2O_3$ substrate flake+($SiO_2$)+$Fe_2O_3$ substrate flake+($SiO_2$)+$Fe_3O_4$+$SiO_2$+$TiO_2$     (A)

Particular preference is given to effect pigments having the following structure:

mica or $Al_2O_3$ flake+($SnO_2$)+$TiO_2$ mica or $Al_2O_3$ flake+$Fe_2O_3$ mica or $Al_2O_3$ flake+$Fe_2O_3$ (doped with Mg)

mica or $Al_2O_3$ flake+$Fe_3O_4$ mica or $Al_2O_3$ flake+$Fe_3O_4$+$SiO_2$+$TiO_2$ mica or $Al_2O_3$ flake+$Fe_3O_4$ (doped with Al)+$SiO_2$+$TiO_2$ mica or $Al_2O_3$ flake+$TiO_2$/$Fe_2O_3$ mica or $Al_2O_3$ flake+($SnO_2$)+$TiO_2$+$SiO_2$+$TiO_2$ mica or $Al_2O_3$ flake+$TiO_2$/$Fe_2O_3$ mica or $Al_2O_3$ flake+$TiO_2$/$Fe_2O_3$+$SiO_2$+$TiO_2$ mica or $Al_2O_3$ flake+$TiO_2$/$Fe_2O_3$+$SiO_2$+$TiO_2$/$Fe_2O_3$ mica or $Al_2O_3$ flake+$TiO_2$/$Fe_2O_3$+$SiO_2$+$SnO_2$+$TiO_2$+ $TiO_2$/$Fe_2O_3$ mica or $Al_2O_3$ flake+$TiO_2$/$Fe_2O_3$+$SiO_2$+$TiO_2$+$TiO_2$/ $Fe_2O_3$ mica or $Al_2O_3$ flake+$(SnO_2)$+$TiO_2$+$SiO_2$+$TiO_2$/$Fe_2O_3$ mica or $Al_2O_3$ flake+$TiFe_2O_5$ glass flake or $SiO_2$ flake+$(SiO_2)$+$Fe_2O_3$ glass flake or $SiO_2$ flake+$(SiO_2)$+$TiO_2$ glass flake or $SiO_2$ flake+$SiO_2$+$TiO_2$ glass flake or $SiO_2$ flake+$SiO_2$+$TiO_2$+$SiO_2$ glass flake or $SiO_2$ flake+$(SiO_2)$+$TiO_2$+$SiO_2$+$TiO_2$ glass flake or $SiO_2$ flake+$(SiO_2)$+$TiO_2$/$Fe_2O_3$ glass flake or $SiO_2$ flake+$(SiO_2)$+$TiO_2$/$Fe_2O_3$+$SiO_2$+ $TiO_2$ glass flake or $SiO_2$ flake+$(SiO_2)$+$TiO_2$/$Fe_2O_3$+$SiO_2$+ $TiO_2$/$Fe_2O_3$ glass flake or $SiO_2$ flake+$(SiO_2)$+$TiO_2$/$Fe_2O_3$+$SiO_2$+ $TiO_2$+$TiO_2$/$Fe_2O_3$ glass flake or $SiO_2$ flake+$(SiO_2)$+$TiO_2$+$SiO_2$+$TiO_2$/ $Fe_2O_3$ glass flake or $SiO_2$ flake+$(SiO_2)$+$TiFe_2O_5$    (B)

Especial preference is given to effect pigments having the following structure:

$Al_2O_3$ flake+$TiO_2$/$Fe_2O_3$+$SiO_2$+$TiO_2$ $Al_2O_3$ flake+$TiO_2$/$Fe_2O_3$+$SiO_2$+$TiO_2$+$TiO_2$/$Fe_2O_3$ $Al_2O_3$ flake+$TiO_2$/$Fe_2O_3$+$SiO_2$+$SnO_2$+$TiO_2$+$TiO_2$/ $Fe_2O_3$ $Al_2O_3$ flake+$SnO_2$+$TiO_2$/$Fe_2O_3$+$SiO_2$+$SnO_2$+$TiO_2$+ $TiO_2$/$Fe_2O_3$ $Al_2O_3$ flake+$Fe_2O_3$ $Al_2O_3$ flake+$Fe_2O_3$ (doped with Mg)

$Al_2O_3$ flake+$Fe_3O_4$+$SiO_2$+$TiO_2$ $Al_2O_3$ flake+$Fe_3O_4$ (doped with Al)+$SiO_2$+$TiO_2$    (C)

Due to the material composition of the various layers, the effect pigments mentioned above often have not only optically evident effects, such as interference colours, absorption colours or optically variable effects, but in addition may also have magnetic, magnetisable, and, optionally in the case of a suitable material choice, doping and layer thickness, intrinsic or direct electrically conductive, IR- or UV-absorbent or also under various conditions luminescent properties.

The layers comprising metal oxides, hydroxides and/or oxide hydrates are preferably applied to the corresponding support flakes by wet-chemical methods, where the wet-chemical coating methods developed for the preparation of effect pigments, which result in enveloping of the substrate, can be used. After the wet-chemical application, the substances may be in the form of oxides, hydroxides and/or oxide hydrates.

The coated products are subsequently separated off, washed, dried and preferably calcined. The oxides, hydroxides and/or oxide hydrates formed in the case of wet-chemical application are thereby converted into the corresponding oxides and/or mixed oxides. The drying can be carried out at temperatures of 50-150° C. for usually ≥10 minutes, optionally for 6-18 hours.

The calcination can be carried out at temperatures of 250-1000° C., preferably at 400-950° C., for usually 0.5-3 hours.

The size of the effect pigments used is only crucial for the printed image according to the invention inasmuch as the effect pigments used must be suitable for printing processes with respect to their size. Their length or width extension is therefore usually in the range 1-200 µm, in particular in the range 1-150 µm and particularly preferably in the range 5-60 µm. The thickness of the pigments is usually between 0.05 and 5 µm, in particular between 0.1 and 4.5 µm. The form factor of the pigments (aspect ratio: ratio of diameter to thickness) is at least 2 and is in particular in the range from 5 to 300, particularly preferably in the range from 20 to 200. Depending on the printing process employed, the corresponding sizes of the effect pigments are selected in accordance with the art in such a way that unproblematic printing is possible.

The effect pigments employed for the first area unit in accordance with the present invention can be incorporated into printing inks without problems and have no leafing properties in the respective part of the printed image according to the invention, i.e. they arrange themselves in a random distribution in the printed layer and not preferentially at the surface thereof.

The second area unit of the printed image according to the invention comprises effect pigments (the second effect pigment) which are based on coated support flakes and have an outer layer comprising an organic surface modifier. The type of support flakes and of the first coatings located thereon does not differ in any way from the structure of the first effect pigments used for the first area unit. All above-mentioned support flakes, coating materials and layer sequences can likewise be used.

The second flake-form effect pigment used for the second area unit also has a layer comprising a non-metallic, inorganic material directly below the outer layer comprising an organic modifier.

Apart from the outer layer comprising an organic modifier which have the pigments used for the second area unit, these preferably exhibit virtually no difference in type and composition from the effect pigments used for the first area unit. However, it may also be advantageous to use effect pigments whose optical and optionally functional properties differ from one another in both area units, i.e. if, for example, first and second effect pigments of the same colour having different functional properties or first and second effect pigments of different colours are used.

In a particularly preferred embodiment of the present invention, the first and second effect pigment differ, however, merely through the outer layer comprising an organic surface modifier on the second flake-form effect pigment. This means that the absorption colour, if present, the interference colour and optionally an optically variable effect due to different interference colours depending on the angle corresponds in the two effect pigments and these are otherwise identical with respect to materials, layer sequences and thicknesses and particle size. Any functional properties present also correspond. The first and second area unit thus merely differ here through a different degree of reflection of the two area units, expressed by a different flop index.

The coating used as outer layer for the second effect pigment is preferably a layer which comprises organofunctional siloxanes as organic surface modifier. These may be present alone or in a mixture with organofunctional silanes.

It has proven particularly advantageous if the organofunctional siloxanes, which are, in particular, oligo- and/or polysiloxanes, contain primary or secondary amino groups and fluoroalkyl groups, in particular aminoalkyl groups and fluoroalkyl groups, as functional groups. These may be present separately on different siloxanes in a siloxane mixture, but are preferably located on one and the same siloxane molecule or oligo- or polysiloxane molecule.

The molar ratio of the fluoroalkyl groups to the amino groups, in particular aminoalkyl groups, here is 1:2 to 5:1, preferably 2:1 to 5:1 and in particular 3:1 to 5:1.

Oligo- or polysiloxanes containing C1-C4-aminoalkyl groups, in particular containing C1-C2-aminoalkyl groups, are preferred here. Preferred oligo- or polysiloxanes containing fluoroalkyl groups contain C1-C20, in particular C1-C10, particularly preferably C2-C6, fluoroalkyl groups. However, oligoor polysiloxanes which contain C2-C6-fluoroalkyl groups, preferably perfluorinated groups, and simultaneously C1-C2-aminoalkyl groups are especially preferred. The latter may optionally additionally also contain alkoxy groups, preferably methoxy or ethoxy groups and/or hydroxyl groups. Particular preference is given to the use of oligo- or polysiloxanes containing the fluoro- and aminoalkyl groups preferably mentioned above and at least one hydroxyl group for bonding to the pigment surface.

In the outer coating of the effect pigments used for the second area unit, some or all of the organofunctional groups may have reacted for bonding to the underlying non-metallic, inorganic surface. The siloxanes are chemically bonded to the surface of the effect pigments here via silanol groups (Si—OH), where an Si—O-effect pigment coupling takes place. If polysiloxanes which contain aminoalkyl groups and simultaneously fluoroalkyl groups are selected, a two- and three-dimensional siloxane network subsequently forms on the pigment surface due to crosslinking, resulting in a chemically, thermally and mechanically resistant coating.

Whereas the aminoalkyl groups facilitate the water solubility of the siloxanes in the coating operation, the fluoroalkyl groups very greatly reduce the surface energy of the pigments.

The effect pigments treated in this way exhibit equally good hydro- and oleophobicity, so that a leafing effect may be observed in the conventional binders after printing of the substrate, i.e. the effect pigments accumulate at the surface of the still-moist printed layer and align themselves there parallel to the substrate. Significantly increased reflection therefore occurs at the surface of the area unit printed in this way.

Owing to the low surface energy of these effect pigments, however, excellent wetting behaviour of the pigmented binder on the materials to be printed is also facilitated. At the same time, no significant separation of binder and effect pigment in the corresponding printing ink is, surprisingly, to be observed, so that the conventional printing processes can be carried out without problems.

The silanes and siloxanes used in accordance with the invention are commercially available, for example, under the trade name Dynasylan® (Evonik). Especial preference is given to mixtures of Dynasylan® F 8261 (1H,1H,2H,2H-perfluorooctyltriethoxysilanes) with Dynasylan® AMEO (aminopropyltriethoxysilane) or Dynasylan DAMO (N-(2-aminoethyl)-3-aminopropyltrimethoxysilane), or the sole use of Dynasylan® F 8815. The latter is particularly preferred.

The application of the surface modifier to the surface of the effect pigments can be carried out by simple mixing of the effect pigments and the undiluted surface modifier in a suitable mixer, but is preferably carried out by mixing the effect pigments with the surface modifier dissolved in a solvent at temperatures above 50° C. Suitable solvents are organic solvents, water or mixtures thereof. Preference is given to the use of water. The reaction time required for the application of the organic coating is at least 5 minutes, but is preferably carried out in a period of 10 to 90 minutes. If required, however, the reaction time can be extended as desired. The coated pigment is then worked up and isolated by methods which are usual in the art, for example by filtration, drying and sieving.

The pigments coated in this way have a surface energy of ≤50 mN/m, preferably of ≤20 mN/m. In particular, effect pigments having a surface energy of ≤10 mN/m are preferred.

The layer thickness of the applied outer layer comprising an organic surface modifier is in the range from 2 to 5 nm.

The first and second area unit of the printed image according to the invention preferably comprise, as flake-form effect pigments, exclusively the flake-form effect pigments described above and no further, other effect pigments.

Pigment-like fillers and/or absorbent colorants, which may be of organic or inorganic origin, may, however, likewise be present, if necessary, in the first and second area unit of the printed image according to the invention so long as the desired reflection behaviour of the two area units is not significantly hindered.

Binders which can be employed for the first and second area unit of the printed image according to the invention are the conventional binders which are customary in printing inks. For example, binders for printing inks on a nitrocellulose basis, polyamide basis, acrylic basis, polyvinylbutyral basis, PVC basis, PUR basis or suitable mixtures thereof can be employed. However, binders on a UV-curing basis (curing by means of free radicals or cationically) are especially suitable and are therefore preferred.

It goes without saying that the printed image according to the invention is applied to the substrate by means of a printing ink in a conventional printing process. The printing ink is preferably a screen printing ink, a gravure printing ink, a flexographic printing ink or an intaglio printing ink.

Printing inks usually also comprise solvents. These may be organic solvents and/or water. From environmental-protection and applicational perspectives, aqueous printing inks are preferred here. Organic solvents can be branched and unbranched alcohols, aromatic compounds and alkyl esters, such as, for example, ethanol, 1-methoxypropanol, 1-ethoxy-2-propanol, ethyl acetate, butyl acetate or toluene. However, particular preference is given to UV-curing printing inks as already mentioned above, whose solvent content is low or virtually absent.

Apart from a binder and the flake-form effect pigments employed in accordance with the invention, the corresponding printing ink may also comprise the conventional further constituents, such as assistants and/or additives. These are employed in accordance with the art and do not differ from the materials usually employed for printing inks. Mention may be made here, for example, of wetting agents, lubricants, antiblocking agents, adhesion promoters, drying accelerators and photoinitiators.

The said assistants, if they are solids and if they are present in the printing ink, are generally also present on the corresponding area units after solidification of the printing ink on the substrate besides the effect pigments and the binder. This does of course not apply to any solvents employed in the printing ink, which evaporate or are removed in another manner during solidification of the printing ink. The proportion by weight of the effect pigments in the respective area units of the printed image according to the invention is therefore also higher than in the respective printing ink used and is in the range between 1 and 40% by weight, preferably from 10 to 40% by weight, based on the solidified printed layer or the printed image.

The substrate employed in accordance with the invention comprises materials which can usually be printed. Mention may be made by way of example of paper, cardboard, wallpaper, tissue material, polymers (as body or film), metal (as body or foil), ceramic, glass, wood, textile materials or composite materials comprising two or more of the above-mentioned materials, for example laminates containing a paper layer. It is also possible to employ coated, calendered and/or satinised papers or papers and films which are coated with primer layers. The specialty papers and polymer films which are usually employed for the production of documents of value and banknotes, particularly preferably banknote paper, are particularly suitable. Since their composition is known to the person skilled in the art, there is no need to go into details in this respect here. In the case of comparatively low printed-layer thicknesses, it has proven particularly advantageous if the printed substrates have a rather smooth surface.

Overall, it is essential that binder, amount and type of any solvent used and the print substrate are matched to one another in such a way that the intended leafing effect is able to form in the second area unit. To this end, a suitable layer thickness of the still-moist printed layer, a comparatively long drying time of the moist printing ink on the substrate and a suitable surface quality of the substrate is necessary. Whereas very sorptive substrates can also be employed in the case of high layer thicknesses of the moist printed layer, printing processes which only produce low layer thicknesses require smoother surfaces and as far as possible the use of UV-curing binders. The choice of the respective conditions is based on the expert knowledge of the particular person skilled in the art of printing and requires no inventive step.

The wet-layer thickness of the applied printed layer is in accordance with the invention in the range from 3 to 200 µm, preferably from 10 to 100 µm, which corresponds to dry-layer thicknesses of about 1 to 150 µm, or 3 to 80 µm respectively.

In a particularly preferred embodiment of the present invention, the printed image according to the invention additionally has a laser marking. This may, depending on the material composition of the effect pigments employed in each case and the laser apparatus used, consist of an ablated marking on the printed image or a dark to black-coloured laser marking in the printed image. Surprisingly, it has been found that the organic surface coating on the effect pigments of the second area unit does not impair the absorption behaviour of the effect pigments under laser irradiation.

In the case of laser ablation, the entire pigment layer in the areas irradiated by the laser is removed from the substrate without the substrate itself discolouring.

In the case of a dark laser marking, the effect pigments at the points subjected to the laser are, depending on the laser parameters set, either retained in full or alternatively removed completely or also only partly from the printed image, where, however, in all cases a dark coloration of the print substrate additionally occurs due to heating of the substrate.

The laser marking here may be located on only one of the area units or also simultaneously on both area units. It is preferably arranged as a coherent marking over both area units. A seamless, homogeneous, high-contrast marking which is totally independent of the degree of reflection of the respective area unit arises here.

Suitable lasers can be solid-state lasers, such as YAG/$NdVO_4$ lasers having a wavelength of 1064 nm, 532 nm and 355 nm, or gas lasers (for example $CO_2$ lasers) having a wavelength of 9.1 µm, 9.3 µm and 10.6 µm.

The present invention also relates to a process for the production of a printed image, in which a first printing ink, comprising a first flake-form effect pigment, which is based on a coated support flake and has an outer layer comprising a non-metallic, inorganic material, and a binder, is applied to a substrate with formation of a first area unit of a printed image and solidified, and in which a second printing ink comprising a second flake-form effect pigment, which is based on a coated support flake and has an outer layer comprising an organic surface modifier, and a binder, is applied to a substrate with formation of a second area unit of a printed image and solidified.

The printing inks employed are the printing inks usually used in common printing processes, with the proviso that the printing ink for the first area unit comprises a first flake-form effect pigment which is based on a coated support flake and has an outer layer comprising a non-metallic, inorganic material, and the second printing ink for the second area unit comprises a second flake-form effect pigment which is likewise based on a coated support flake and has an outer layer comprising an organic surface modifier.

The non-functionalised and organically functionalised flake-form effect pigments and the further conventional printing-ink constituents have already been discussed above. The comments in this respect likewise apply here. In general, printing-ink vehicles which already comprise all conventional printing-ink constituents apart from the requisite colour- or effect-providing pigments and any additional viscosity-determining amounts of solvent are offered by the respective manufacturers in ready-to-use form. In accordance with the invention, particular preference is given to the use of printing inks which are UV-curing and thus have only a low solvent content or none at all.

The respective printing inks for the first and second area unit which are pigmented with the various flake-form effect pigments are, in accordance with the present invention, applied to the substrate by means of conventional printing processes. Suitable printing processes here are, in particular, a screen printing process, a gravure printing process, a flexographic printing process or an intaglio printing process (special gravure printing process using paste-form printing inks and with a high layer thickness). Other conventional printing processes can likewise be employed so long as the requirements described above with respect to the interaction of binder, solvent and substrate can be met, so that the intended leafing effect can be established in the second area unit of the printed image.

A screen printing process is particularly preferably employed.

The printing ink is applied in accordance with the art to the substrate to be coated and solidified. The solidification operation here can be a physical drying process, but is preferably supported by the supply of heat and/or UV light. UV-curing systems are especially preferably employed.

Conventional printing processes per se already prespecify a mechanically initiated orientation of the pigments parallel to the printed surface to a certain extent. The first flake-form effect pigments employed for the first area unit in the first printing ink are consequently already aligned substantially parallel to the surface of the substrate. However, this alignment takes place over the volume of the entire printed layer, since the effect pigments are homogeneously distributed in the printing ink and in the wet printed layer. However, the coating with an organic surface modifier, as described above, causes the second flake-form effect pigments employed in the second printing ink for the second area unit additionally to try to reach the surface in the printed, still-moist layer, but without detaching themselves from the binder system. There, they align themselves parallel to the substrate. A very much larger number of flake-form effect pigments coated with an organic surface coating is therefore located, viewed at the specular angle, at the surface of the printed image in the reflection position than is the case in the printing of uncoated pigments, such as in the first area unit.

The formation of the two- and three-dimensional siloxane network in the case of the fluoroalkyl- and aminoalkyl-functionalised oligo- or polysiloxanes particularly preferably used in accordance with the invention overcomes an otherwise fundamental disadvantage of conventional leafing coatings of effect pigments, which is often evident from the inadequate mechanical abrasion resistance of the pigments on the surface. The increased degree of reflection of the printed layer comprising the organically functionalised pigments can thus be observed at the specular angle at the same time as high chemical, mechanical and thermal resistance of the printed layer. Outside the specular angle, this printed layer appears darker than a printed layer comprising uncoated pigments, i.e. darker than the first area unit of the printed image according to the invention printed with the first printing ink, since only few pigments are not aligned parallel to the surface and are able to reflect in the detection direction outside the specular angle.

The first and second printing ink are in each case applied to the substrate either directly adjacent to one another or at such a small separation from one another that the first and second area unit of the printed image according to the invention can be registered simultaneously when observed with the naked eye. It goes without saying that a plurality of area units formed from the first or second printing ink can also be applied to the substrate. The graphic design of the printed image according to the invention is not restricted to this extent, so long as the first and second area unit as described above are present and can be perceived in their optical and optionally functional properties, but at least in a different degree of reflection, or flop index. For this purpose, the respective area units must be sufficiently large that this differentiation is possible. This is generally the case from a size of the respective printed area of a few square millimetres, for example from about 4 mm$^2$. There are virtually no upper limits on the size of the printed area units, so long as conventional printing processes can be used.

In a preferred embodiment of the present invention, the first and/or second area unit are additionally provided with a laser marking after solidification of the printed layer.

As already described above, the organic surface modification of the second effect pigments in the second area unit does not hinder the laser absorption capacity of the effect pigments, since the organic surface modification merely has a very low layer thickness.

The laser apparatuses usually used for laser markings can therefore optionally be used to apply a laser marking, which can be an ablative or dark to black laser marking, to the first and/or second area unit of the printed image according to the invention. However, the laser marking preferably extends over at least parts of the first and second area unit, where a uniform marking is obtainable in which no differences are evident qualitatively between the first and second area unit.

The present invention also relates to the use of the printed image described above as decoration element, as functional element or as security feature on a product. The main purpose of the respective use here is determined by the nature and structure of the flake-form effect pigments used in each case. Substrates or products are restricted merely via the feature of printability using conventional printing processes. However, a common feature in all possible types of use is the different appearance in relation to the degree of reflection of the first and second part-areas of the printed image according to the invention, irrespective of whether the layers also in each case have non-optical functions or not and which colour combinations the respective effect pigments exhibit. The different degree of reflection of the area units is evident from striking matt/gloss effects of the printed image according to the invention, where the first area unit has a rather more matt optical impression and the second area unit has a highly glossy optical impression. The optical impression of the first area unit here corresponds to that of a conventional printed image produced using flake-form effect pigments in the printing ink, i.e. this part of the printed image, in itself and without the possibility of comparison with the second part-area, can readily also be perceived as "glossy", depending on the type of pigments used.

The printed image according to the invention is particularly preferably employed for the design of security products, i.e. for banknotes, cheques, credit cards, shares, passports, identity documents, driving licences, entry tickets, revenue stamps, labels, packaging materials, seals and the like. Particular preference is given to the use for banknote printing, in particular if non-optical functional features of the effect pigments employed and/or the laser marking described above are also present in addition to the optical features.

The printed image according to the invention enables striking matt/gloss effects to be achieved which can be produced by means of conventional printing processes, can be combined with various non-optical properties and can be employed in a versatile manner without, in the simplest embodiment, having to employ effect pigments which are different from one another optically and in structure. Whereas, in the prior art using non-metallic effect pigments, strong gloss effects can often only be achieved in the case of very large particle sizes of the effect pigments, which are usually not suitable for use in printing processes, the printed image according to the invention can already result in striking gloss effects on part-areas, even in the case of effect pigments of moderate and low particle sizes.

The invention will be explained below with reference to examples, but is not intended to be restricted thereto.

EXAMPLE 1

Figure 1:
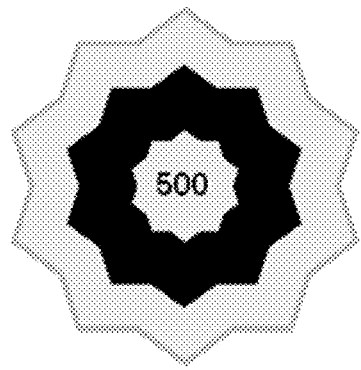
FIGS. 1-5 show various design examples of the printed image in accordance with the present invention.
Figure 2:
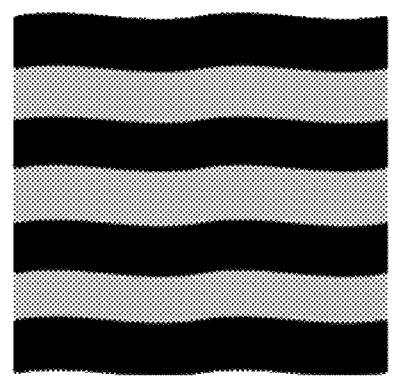
Figure 3:
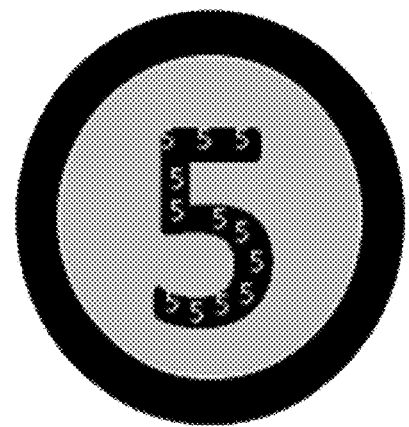

Organic Surface Modification 1000 g of Colorcrypt® Intaglio Gold (product from Merck KGaA) are prewetted with 100 g of water in a heatable mixer. 35 g of Dynasylan® F8815 (Evonik) are added, followed by 100 g of a 2.5% ammonia solution. The batch is mixed at 60° C. for 30 minutes and freed from water at 120° C. The product is subsequently sieved using a mesh width of 63 µm.

EXAMPLE 2

Organic Surface Modification 150 g of each of Colorcrypt® M Silver, Colorcrypt® M Gold and Colorcrypt® M Bronze (products from Merck KGaA) are suspended in 1.5 l of water and heated to 55° C. with stirring. A pH of 4 is set using hydrochloric acid, and 6.68% by weight, based on the pigment employed, of Dynasylan® F8815 (Evonik) are added dropwise over the course of 18 minutes, and the mixture is stirred for a further 30 min. A pH of 8 is set using sodium hydroxide solution over the course of 22 minutes, and the mixture is stirred for a further 60 minutes. After filtration, the products are freed from water at 150° and sieved using a mesh width of 40 µm.

The surface energy of the effect pigments surface-modified in Example 1 and 2 is determined by the "sessile drop" method using the measurement liquids water, 1,2-diiodomethane, benzyl alcohol and 1,2 pentanediol using a Krüss DAS 100 measuring instrument at 22-24° C. 5 µl drops are placed semi-automatically on a pigment layer by means of the Krüss "DAS 3", release 1.7.1 control and evaluation software, and the contact angles between drop and pigment layer surface are measured. The evaluation is carried out by the Owens, Wendt, Rabel and Kaelble (OWRK) method by means of the above-mentioned software.

The total surface energies determined for the coated pigments exhibit a drastic reduction from 48-58 mN/m to <10 mN/m (Table 1) after surface modification has been carried out, where the polar fraction of the total surface energies is eliminated virtually completely by the siloxane oligomer coating and only a dispersive fraction remains (Table 2).

(all effect pigments denoted by M here are magnetisable)

TABLE 1

Total surface energies of the uncoated/coated pigments by the OWRK method;

| Pigment | Total surface energy of the uncoated pigment [mN/m] | coated pigment[*] [mN/m] |
|---|---|---|
| Colorcrypt® M Gold | 51.4 | 7.2 |
| Colorcrypt® Intaglio Gold | 58.0 | 4.9 |
| Colorcrypt® M Silver | 58.0 | 3.0 |
| Colorcrypt® M Bronze | 48.5 | 5.3 |

[*] all pigments were coated with 1% by weight of Dynasylan® F8815, apart from Colorcrypt® M Gold with 0.5% by weight

TABLE 2

Dispersive and polar fraction of the total surface energies of the uncoated/coated pigments;

| Pigment | Dispersive fraction [mN/m] | Polar fraction [mN/m] |
|---|---|---|
| Colorcrypt® M Gold uncoated | 32.1 | 19.3 |
| Colorcrypt® M Gold coated[*] | 7.2 | 0.0 |
| Colorcrypt® Intaglio Gold uncoated | 27.6 | 30.4 |
| Colorcrypt® Intaglio Gold coated[*] | 4.8 | 0.1 |
| Colorcrypt® M Silver uncoated | 34.0 | 24.0 |
| Colorcrypt® M Silver coated[*] | 3.0 | 0.0 |
| Colorcrypt® M Bronze uncoated | 33.3 | 15.2 |
| Colorcrypt® M Bronze coated[*] | 5.0 | 0.3 |

[*] all pigments were coated with 1% by weight of Dynasylan® F8815, apart from Colorcrypt® M Gold with 0.5% by weight

EXAMPLE 3

Production of Printed Layers

15% by weight of Colorcrypt® M Gold (surface-modified or untreated) 85% by weight of screen-printing binder, e.g. WEILBURGER UV 363030

The untreated or surface-modified pigments are in each case stirred separately into the screen-printing binder under gentle conditions and printed onto two area units located alongside one another on paper substrates using a 64T screen. The UV binder is subsequently crosslinked using a Hoenle UV lamp.

Printing inks comprising Colorcrypt® M Silver, Colorcrypt® M Bronze or Colorcrypt® Intaglio Gold are printed analogously.

The lightness values L* of the printed layers at the measurement angles θ of 15°, 45° and 110° are determined by means of a BykGardner BykMac colour measuring instrument, and the flop index is calculated as follows:

$$\text{Flop index} = \frac{2.69(L^*_{15°} - L^*_{110°})^{1.11}}{(L^*_{45°})^{0.86}}$$

Table 3 shows the flop indices for the lightness flop of the printed layers comprising coated and uncoated pigments, where it becomes clear that the flop index increases significantly in the case of a suitable combination of binder and coated pigment.

The most suitable binders having the greatest increase in the flop index are WEILBURGER UV 363030 and G&D UV 4800 having flop indices of 8-11 (pure metal pigments have a flop index of 15-17), where the pigments Colorcrypt® M Gold and Bronze exhibit the greatest effect.

TABLE 3

Flop index and flop index difference of the uncoated/coated pigments in various UV binder systems

| Binder | Pigment | Flop index of the uncoated pigment | Flop index of the coated pigment*) | Flop index difference |
|---|---|---|---|---|
| WEIL-BURGER UV 363030 | Colorcrypt ® M Gold | 3.3 | 8.3 | 5.0 |
| RUCO UV 960 161 | Colorcrypt ® M Gold | 3.8 | 6.4 | 2.6 |
| | Colorcrypt ® Intaglio Gold | 1.9 | 2.8 | 0.9 |
| | Colorcrypt ® M Silver | 4.2 | 6.7 | 2.5 |
| | Colorcrypt ® M Bronze | 3.5 | 7.8 | 4.3 |
| PRÖLL UV 57966 | Colorcrypt ® M Gold | 3.3 | 7.3 | 4.0 |
| | Colorcrypt ® Intaglio Gold | 2.1 | 2.6 | 0.5 |
| | Colorcrypt ® M Silver | 4.0 | 6.7 | 2.7 |
| | Colorcrypt ® M Bronze | 2.8 | 6.8 | 4.0 |
| G&D UV 4800 | Colorcrypt ® M Gold | 3.9 | 9.8 | 5.9 |
| | Colorcrypt ® Intaglio Gold | 1.8 | 5.0 | 3.2 |
| | Colorcrypt ® M Silver | 5.3 | 9.3 | 4.0 |
| | Colorcrypt ® M Bronze | 3.9 | 11.4 | 7.5 |

*) all pigments were coated with 1% by weight of Dynasylan® F8815, apart from Colorcrypt ® M Gold with 0.5% by weight The lightness $L_{15}°$ at a measurement angle $\theta$ of 15°, i.e. 15° away from the specular angle, is determined using the BykGardner BykMac colour measuring instrument (Table 4). It is found that the printed layers comprising coated pigments have significantly higher lightness values than the printed layers comprising uncoated pigments even at an angle which is 15° away from the actual specular angle, where the combination with the binders WEILBURGER UV 363030 and G&D UV 4800 again exhibit the greatest increases here.

TABLE 4

Lightness $L^*_{15°}$ of the uncoated/coated pigments in various UV binder systems

| Binder | Pigment | uncoated pigment $L^*_{15°}$ | coated pigment*) $L^*_{15°}$ | $L^*_{15°}$ difference |
|---|---|---|---|---|
| WEIL-BURGER UV 363030 | Colorcrypt ® M Gold | 63 | 93 | 30 |
| RUCO UV 960 161 | Colorcrypt ® M Gold | 69 | 79 | 10 |
| | Colorcrypt ® Intaglio Gold | 76 | 80 | 4 |
| | Colorcrypt ® M Silver | 60 | 74 | 14 |
| | Colorcrypt ® M Bronze | 64 | 80 | 16 |
| PRÖLL UV 57966 | Colorcrypt ® M Gold | 68 | 85 | 17 |
| | Colorcrypt ® Intaglio Gold | 78 | 81 | 3 |
| | Colorcrypt ® M Silver | 62 | 76 | 14 |
| | Colorcrypt ® M Bronze | 58 | 76 | 18 |
| G&D UV 4800 | Colorcrypt ® M Gold | 69 | 98 | 29 |
| | Colorcrypt ® Intaglio Gold | 75 | 93 | 18 |
| | Colorcrypt ® M Silver | 67 | 83 | 16 |
| | Colorcrypt ® M Bronze | 63 | 93 | 30 |

*) all pigments were coated with 1% by weight of Dynasylan® F8815, apart from Colorcrypt ® M Gold with 0.5% by weight

EXAMPLE 4

Production of Lasered Printed Layers

The multi-area printed images printed in accordance with Example 3 in any desired design (see FIGS. 1-5), in each case provided alternately with untreated or surface-modified pigments, are lasered using an NdVO$_4$ laser (1064 nm, 12 W) under the laser conditions shown in Table 5.

Figure 4:
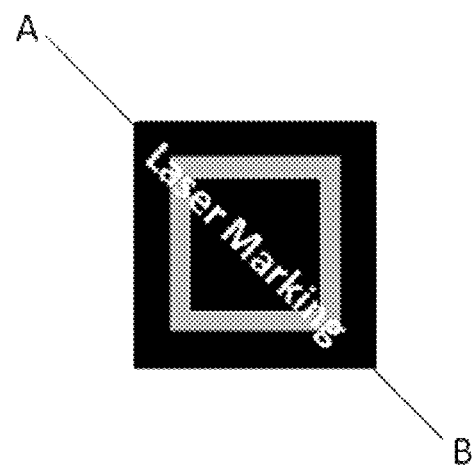
Figure 4A:
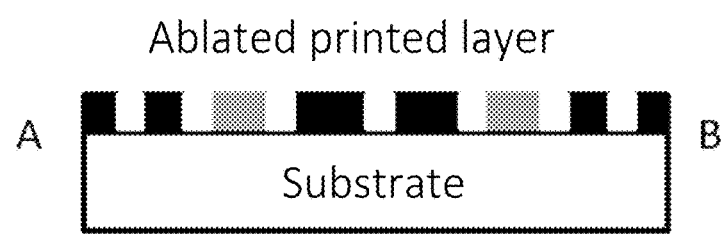
FIGS. 4a and 5a show cross sections along the respective line A-B of FIGS. 4 and 5.
Figure 5:
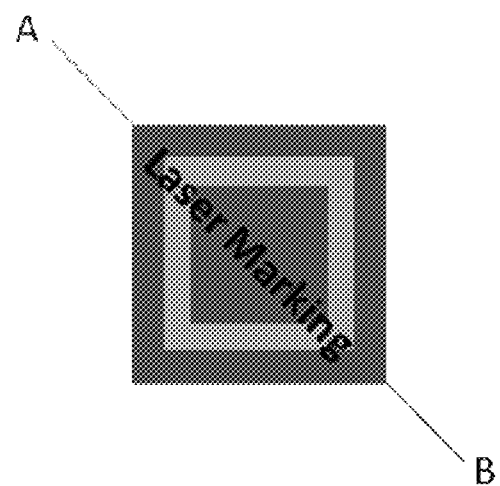
Figure 5A:
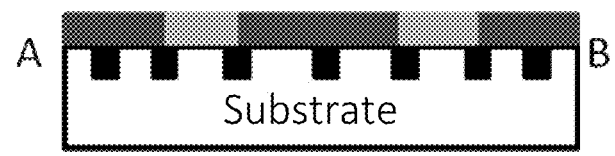

The laser marking covers both the matter printed areas printed with untreated pigments and also the printed areas with a metallic lustre printed with surface-modified pigments, without inhomogeneities or differences in the laser marking thereby becoming evident. The laser marking thus produces a completely homogeneous, seamless and uniform connection over the printed areas having a different degree of reflection (FIG. 4).

The choice of laser is not limited to the near IR region, but can also be extended to commercial lasers into the UV region (355 nm) or far IR region (10.6 µm).

TABLE 5

Laser parameters for various laser-induced effects using an NdVO$_4$ laser (1064 nm, 12 W laser, actual laser power: 10.5 W)

| Laser effect | Energy [%] | Frequency [kHz] | Speed [mm/s] | Focus position [mm] |
|---|---|---|---|---|
| Ablation without heating of the print substrate | 100 | 16 | 170-2700 | −10 to +3 |
| | 90-100 | 10 | 400-800 | +1 |
| | 100 | 10 | 500 | −1 |
| Ablation with heating of the print substrate | 100 | 2-64 | 170-2700 | −13 to +6 |
| | 100 | 2-64 | 170-2700 | −13 to +5 |
| Dark coloration without ablation | 100 | 16 | 2700 | +12 |
| | 100 | 32 | 2000-2700 | +14 |
| | 100 | 2-64 | 170-2700 | +5 to +14 |

If a CO$_2$ laser (10.6 µm, 30 W laser, frequency 25 kHz) is used instead of an NdVO$_4$ laser, ablation takes place, for example, at a laser power of 30-60% at a speed of 1000-3000 mm/s. A dark coloration of the substrate without ablation of the pigment layer can take place at a power of 20%, for example at a speed of 1000 mm/s, at a laser power of 30% at speeds of 1500-2000 mm/s or at a laser power of 70-80% at speeds of 2500-4000 mm/s.

The invention claimed is:

1. A printed image comprising at least two printed area units on a substrate, wherein each of the area units comprises flake-form effect pigments and a binder, a first printed area unit comprising solidified area of a first printing ink comprising a first flake-form effect pigment, said first flake-form effect pigment being based on coated support flakes and having an outermost layer consisting of a non-metallic, inorganic material, and a second printed area unit comprising a solidified area of a second printing ink comprising a second flake-form effect pigment, which is based on coated support flakes and has an outermost layer comprising an organic surface modifier, and wherein said first and second printed area units are visible simultaneously to the naked eye and optically distinguishable from one another when viewing the substrate on a surface carrying the printed image at any viewing angle and have different flop indicies from one another, said first flake-form effect pigments are arranged in random distribution in the first printed area unit and said second flake-form effect pigments are aligned parallel to the substrate at the surface of the second printed area unit.

2. The printed image according to claim 1, wherein the first and second area unit are directly adjacent to one another.

3. The printed image according to claim 1, wherein the organic surface modifier comprises organofunctional siloxanes.

4. The printed image according to claim 3, wherein the organo-functional siloxanes contain fluoroalkyl groups and aminoalkyl groups.

5. The printed image according to claim 1, wherein the second flake-form effect pigment below the outer layer comprising an organic surface modifier has a layer comprising a non-metallic, inorganic material.

6. The printed image according to claim 1, wherein the first and second flake-form effect pigment differ merely through the outer layer comprising an organic surface modifier on the second flake-form effect pigment.

7. The printed image according to claim 1, wherein the first and second flake-form effect pigment are pearlescent pigments, interference pigments, metal-effect pigments or optically variable pigments.

8. The printed image according to claim 7, wherein the first and/or second flake-form effect pigments also have magnetic, electrically conductive or luminescent properties.

9. The printed image according to claim 1, said image having a laser marking.

10. The printed image according to claim 9, wherein the laser marking is located on the first and/or second area unit.

11. The printed image according to claim 1, wherein the substrate is paper, cardboard, wallpaper, tissue material, plastic, metal, ceramic, glass, wood, textile material or a composite material comprising two or more of the above-mentioned materials.

12. The printed image according to claim 11, wherein the paper is banknote paper.

13. The process according to claim 12, wherein the first and/or second printing ink is a screen printing ink, a gravure printing ink, a flexographic printing ink or an intaglio printing ink.

14. A process for the production of a printed image according to claim 1, comprising applying to a substrate a first printing ink, comprising a first flake-form effect pigment, which is based on a coated support flake and has an outermost layer consisting of a non-metallic, inorganic material, and a binder, forming a solidified first area unit of a printed image, and applying to the substrate a second printing ink, comprising a second flake-form effect pigment, which is based on a coated support flake and has an outermost layer comprising an organic surface modifier, and a binder forming a solidified second area unit of a printed image, where the first and second area units are applied to the substrate at a separation from one another so that they are simultaneously visible to the naked eye and optically distinguishable from one another when viewing the substrate on a surface carrying the printed image at any viewing angle, and where the first and second area units have different flop indicies from one another.

15. The process according to claim 14, wherein the first and second area unit are applied to the substrate directly adjacent to one another.

16. The process according to claim 14, wherein the outer layer of the second effect pigment comprises organofunctional siloxanes.

17. The process according to claim 16, wherein the organofunctional siloxanes are siloxanes which contain fluoroalkyl groups and aminoalkyl groups.

18. The process according to claim 14, wherein the first and/or second area unit are provided with a laser marking.

19. A product having a decoration element, functional element or security feature, said decoration element, functional element or security feature comprising a printed image according to claim 1.

20. The product according to claim 19, that is banknotes, cheques, credit cards, shares, passports, identity documents, driving licences, entry tickets, revenue stamps, labels, packaging materials or seals.

* * * * *